(12) United States Patent
Tompkins et al.

(10) Patent No.: US 6,856,898 B1
(45) Date of Patent: Feb. 15, 2005

(54) PDA SYSTEMS, FUNCTIONAL DATA, AND METHODS TO BIAS MAP MATCHING

(75) Inventors: Mark D. Tompkins, Overland Park, KS (US); Jay Dee Krull, Olathe, KS (US)

(73) Assignee: Garmin Ltd. (KY)

( * ) Notice: Subject to any disclaimer, the term of this patent is extended or adjusted under 35 U.S.C. 154(b) by 75 days.

(21) Appl. No.: 10/270,923

(22) Filed: Oct. 15, 2002

Related U.S. Application Data

(63) Continuation-in-part of application No. 10/027,271, filed on Dec. 21, 2001, now Pat. No. 6,647,337.

(51) Int. Cl.⁷ .............................................. G01C 21/00
(52) U.S. Cl. ...................... 701/209; 701/207; 701/210; 340/988; 340/990; 340/995.1
(58) Field of Search .......................... 707/1–3; 701/209, 701/200, 207, 210, 211, 213, 25, 26; 73/178 R; 340/988, 989, 990, 991, 992, 993, 995.1

(56) References Cited

U.S. PATENT DOCUMENTS

| | | | | |
|---|---|---|---|---|
| 5,422,815 | A | | 6/1995 | Hijikata ...................... 364/449 |
| 5,442,559 | A | | 8/1995 | Kuwahara et al. .......... 364/449 |
| 5,528,248 | A | | 6/1996 | Steiner et al. ............... 342/357 |
| 5,659,476 | A | * | 8/1997 | LeFebvre et al. ........... 701/201 |
| 5,938,721 | A | | 8/1999 | Dussell et al. .............. 701/211 |
| 5,948,043 | A | | 9/1999 | Mathis ........................ 701/208 |
| 6,108,603 | A | | 8/2000 | Karunanidhi ............... 701/208 |
| 6,205,398 | B1 | | 3/2001 | Kobayashi et al. ......... 701/209 |
| 6,266,612 | B1 | | 7/2001 | Dussell et al. .............. 701/207 |
| 6,317,684 | B1 | * | 11/2001 | Roeseler et al. ............ 701/202 |
| 6,317,687 | B1 | | 11/2001 | Morimoto ................... 701/211 |
| 6,321,158 | B1 | * | 11/2001 | DeLorme et al. ........... 701/201 |
| 6,411,899 | B2 | | 6/2002 | Dussell et al. .............. 701/211 |
| 6,546,335 | B1 | * | 4/2003 | Tompkins et al. .......... 701/209 |
| 2001/0047242 | A1 | | 11/2001 | Ohta ........................... 701/210 |

OTHER PUBLICATIONS

"An optimal pathfinder for vehicles in real–world digital terrain maps", http://www.nease.net/jamsoft/shortespath/pathfinder/4.html, (1999), 11 pages.

"Informed Search Methods", *Artificial Intelligence, A Modern Approach*, Prentice Hall, Inc., (1995), 92–115.

"Real–Time Vehicle Routing in Dynamic and Stochastic Urban Traffic Networks", http:www/gpu.srv.ualberta.ca/lfu/research.htm, (1997), 1–3.

Ahuja, R., Faster Algorithms for the Shortest Path Problem, *Journal of the Association for Computing Machinery, 37*(2), (1990), pp. 213–223.

Cung, V., et al., "An Efficient Implementation of Parallel A*", *CFPAR*, Montreal, Canada, (1994), pp. 153–167.

Fredman, M., "Fibonacci heaps and their uses in improved network optimization algorithms", *Journal of ACM*, (1987), 2 pages.

Fu, L.. "Heuristic Shortest Path Algorithms and their Potential IVHS Applications", *Proceedings of the 4th University of Alberta—University of Calgary, Joint Graduate Student Symposium in Transportation Engineering*, (1995), pp. 83–109.

(List continued on next page.)

*Primary Examiner*—Thomas C. Black
*Assistant Examiner*—Olga Hernandez
(74) *Attorney, Agent, or Firm*—Devon A. Rolf

(57) ABSTRACT

PDA devices, systems, functional data and methods are provided for biasing an active location to an acceptable location within a planned route of a map. A PDA with map biasing capabilities includes a processor communicating with a memory. In biasing a map, an active position and a planned position are received, and an active score and a planned score are associated with each position, respectively. The active position is checked to ensure it falls within a second range, and if it does the active score is made to fall within a first range associated with the planned score, such that the active position is biased to appear as if it were the planned position.

28 Claims, 11 Drawing Sheets

OTHER PUBLICATIONS

Ikeda, T., "A Fast Algorithm for Finding Better Routes by AI Search Techniques", *Vehicle Navigation and Information Systems Conference Proceedings,* (1994),pp. 291–296.

Kaindl, H., "Memory–Bounded Bidirectional Search", *Proceedings of the 12th National Conference on Art,* AAAI Press, Seattle WA,(1994),pp. 1359–1364.

Laporte, G., "The Vehicle Routing Problem: An Overview of Exact and Approximate Algorithms", *European Journal of Operational Research, 59,* (1992),pp. 345–358.

Myers, B., "Data Structures for Best–First Search", http://www.4.ncsu.edu/jbmyers/dsai.htm, (1997),pp. 1–6.

Ronngren, R., et al., "Parallel and Sequential Priority Queue Algorithms", *ACM Transactions on Modeling and Computer Simulation,* (1997),pp. 168–172, 198,199.

Stout, B., "Smart Moves: Intelligent Pathfinding", *Gamasutra* http://gamasutra.com/features/prgramming/080197/pathfinding.htm, (1997),pp. 1–11.

Wai, Leong.H., et al., "Comparative Study of Shortest Path Algorithm for Transport Network", USRP Report 2, (1999), pp. 1–10.

Zhan, F., "Three Fastest Shortest Path Algorithms on Real Road Networks: Data Structures and Procedures", *Journal of Geographic Information and Decision Analysis,* (1997), 11 pages.

Zhao, Y., "An Adaptive Route–Guidance Algorithm for Intelligent Vehicle Highway Systems", *American Control Conference,* Boston, MA,(1991),pp. 2568–2573.

\* cited by examiner

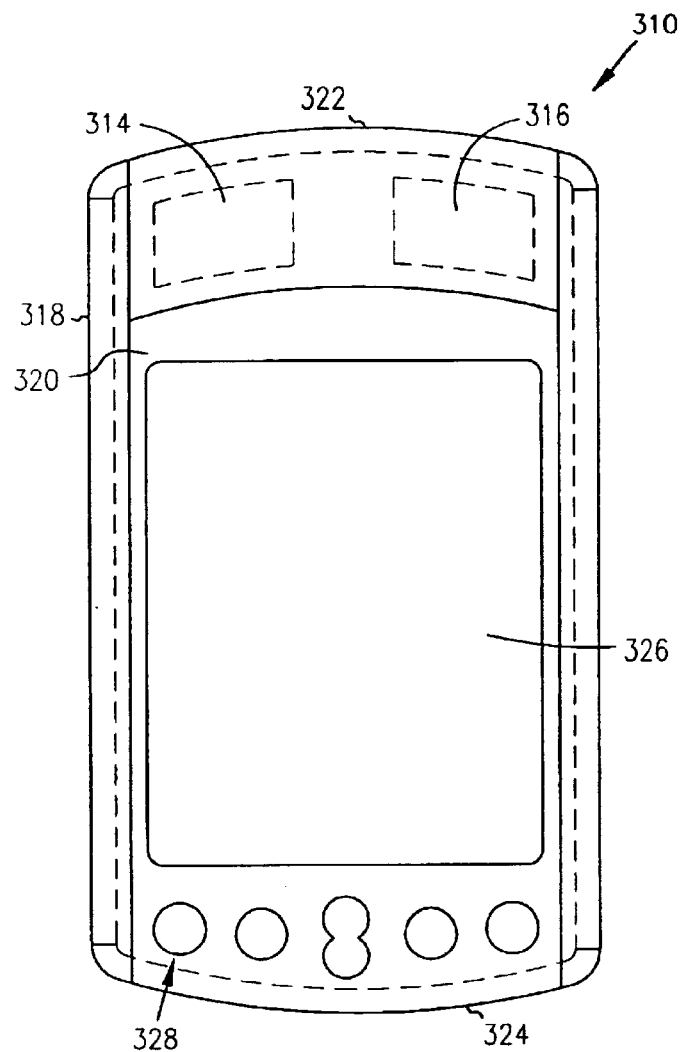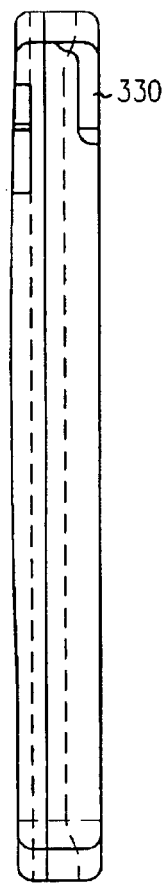
FIG. 3A        FIG. 3B
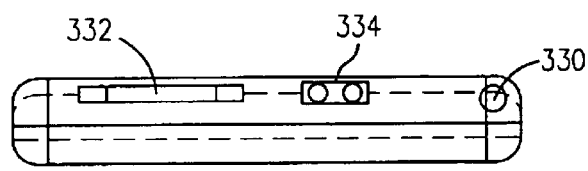
FIG. 3C

PDA SYSTEMS, FUNCTIONAL DATA, AND METHODS TO BIAS MAP MATCHING

CROSS REFERENCE TO RELATED APPLICATIONS

This application is a continuation-in-part of U.S. application Ser. No. 10/027,271, filed Dec. 21, 2001, now U.S. Pat. No. 6,647,337, the specification of which is incorporated herein by reference.

FIELD OF THE INVENTION

The present invention relates generally to navigational devices, and in particular to PDA systems, functional data, and methods to bias a PDA's current location to a route on a map.

BACKGROUND OF THE INVENTION

Route planning devices are well known in the field of navigational instruments. The method of route planning implemented by known prior art systems depends on the capabilities of system resources, such as processor speed and the amount and speed of memory. As increased system capability also increases system cost, the method of route planning implemented by a navigation device is a function of overall system cost.

One type of navigational system includes Global Positioning Systems (GPS). Such systems are known and have a variety of uses. In general, GPS is a satellite-based radio navigation system capable of determining continuous position and velocity information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometrical triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

Further, with a navigational aid device cartographic data are loaded into a memory of the device and manipulated to provide route planning to a user of the device. Cartographic data can include by way of example only, thoroughfare identifications, intersection identifications, altitude information, longitude information, latitude information and the like. The cartographic data are voluminous and as a result, often only specific cartographic data associated with predefined geographic regions are loaded into the device during any particular operation cycle.

Using the cartographic data the device displays a portion of the data as a map to a user of the device, typically identifying the device's location and orientation within the displayed map. Often, the user requests a route within the displayed map which includes a generated path from the device's present location and orientation to a desired location. Accordingly, the route is derived from the cartographic data and presented to the user of the device. Presentation of the device's changing location with respect to the route continues in real time as the device travels along the route.

The process of plotting the device's present location, within the cartographic data, and mapping that location to the map is referred to as map matching or road locking. Generally, problems occur with the road locking process when the precise location of the device at any particular moment in time and space is inaccurate, or when the cartographic data contain slight inaccuracies.

Navigational systems can sometimes provide inaccurate information to a navigational device such that the device inaccurately calculates the precise location of the device. Typically, inaccurate information results when the device is traveling at a rate less than five miles per hour or when satellite interference occurs. Moreover, even when a device is traveling at rate above 5 miles per hour and there exists no satellite interference, the precise location of the device is still a calculated projection which is made by the device, and the projection is not without error. For example, a device traveling at a particular rate of speed having a particular angular direction will determine its location by rapidly calculating at least three locations for the device and then generating a fourth likely location which is road locked to the map.

However, at any particular moment the device's location can coincide with thoroughfare choices emanating from the route, such that the error margin in determining the device's precise location when compared with the now available thoroughfare locations, results in road locking the location of the device to a location off the route. This problem is particularly noticeable when cartographic data associated with the available thoroughfare locations, which are off the route, vary only slightly with available thoroughfare locations, which are on the route. Moreover, these variations within the cartographic data for the thoroughfares can be the result of erroneous cartographic data.

For example, consider two thoroughfare choices, one on the route and one off the route. But, each thoroughfare runs parallel to the other and is separated by only a concrete divider and each thoroughfare runs in parallel to the other for a distance in excess of one mile. A calculation to retrieve the device's location results in road locking the device's location to the thoroughfare located off the route, when in fact the device is located on the route. Obviously, a user of the device will quickly become frustrated and develop a perception that the performance of the device is malfunctioning.

Clearly, in many cases halting travel is not a viable alternative. For example, when the user is traveling on an interstate it is entirely impossible to simply stop. The alternative of pulling off on the shoulder is undesirable and can be dangerous. Pulling off on an exit is equally undesirable since doing so increases travel time and provides an added inconvenience to the user. In other instances, such as navigating downtown city streets, the traffic issues alone may prevent the user from stopping their vehicle during the recalculation process. Even if the user has the ability to safely stop their vehicle, such as when traveling in a neighborhood, the closeness in proximity of available thoroughfares can still yield an inaccurate road lock. Accordingly, capabilities to favorably road lock the location of the device to a thoroughfare located on the route is desirable and is also often a correct reflection of the device's precise location. To achieve this result, more efficient map matching capabilities are needed.

In summary, current prior art systems do not provide adequate map matching or road locking capabilities. Further, as users demand products with greater accuracy and usability, the problem will continue to escalate. As a result, present devices which inadequately perform map matching often frustrate users when thoroughfare choices result in inaccurate calculations that assume the devices' locations are off the route, when in fact the locations of the devices are on the route.

Therefore, there exists a need for a navigational device which more accurately performs map matching capabilities than current systems. In addition, there is also a need for a navigational route planning device which efficiently maps a device's current position to a planned position on a route.

SUMMARY OF THE INVENTION

The above mentioned problems of navigational devices are addressed by the present invention and will be understood by reading and studying the following specification. Devices, systems, functional data, and methods are provided to bias map matching which is more efficient and accurate than current systems. The devices, systems, functional data, and methods of the present invention offer a device having map biasing capabilities superior to current systems. The device is capable of more efficient and accurately mapping a current position of the device to a route.

In one embodiment of the present invention, a method to bias an active position to a planned position is provided. The method dynamically receives the active position and the planned position. Furthermore, the active score associated with the planned position is biased thereby forcing this score to be the most favorable score. Moreover, the biasing is aborted if the active position associated with the planned position falls outside a range.

In another embodiment of the present invention functional data to bias a location to a map is provided having active location data operable to be plotted within the map and a planned path comprising planned location data operable to be plotted within the map. Further, the functional data include an active score associated with the active location data and a planned score associated with the planned path. Moreover, the functional data include bias instruction data to bias the active score in favor of the planned score as long as the active location data do not deviate from the planned path by a preset range.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIGS. 3A–3C illustrate views for another embodiment of an electronic navigational device according to the teachings of the present invention;

DETAILED DESCRIPTION OF THE INVENTION

In the following detailed description of the invention, reference is made to the accompanying drawings which form a part hereof, and in which is shown, by way of illustration, specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to navigational systems and devices having map biasing capabilities. As presented above, one type of navigational system includes Global Positioning Systems (GPS). Such systems are known and have a variety of uses. In general, GPS is a satellite-based radio navigation system capable of determining continuous position, velocity, time, and in some instances direction information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometric triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

Figure 1:
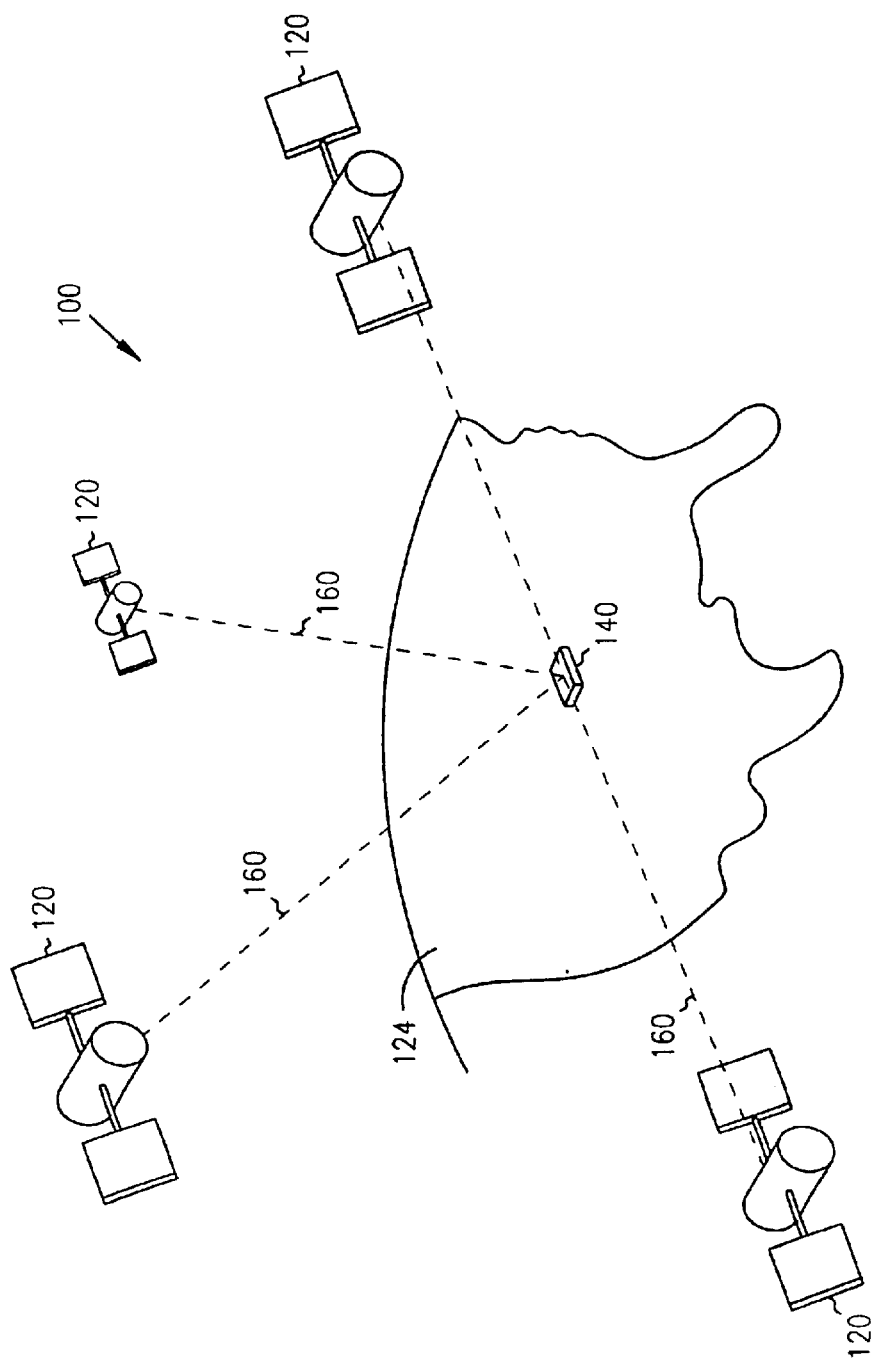
FIG. 1 is a representative view of a Global Positioning System (GPS)

FIG. 1 is representative of a GPS system denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 of the present invention is shown receiving spread spectrum GPS satellite signals 160 from the various satellites 120.

The spread spectrum signals 160 continuously transmitted from each satellite 120 utilizes a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

In fact, although GPS enabled devices are often used to describe navigational devices, it will be readily appreciated that satellites need not be used at all to determine a geographic position of a receiving unit, since cellular towers or any customized transmitting radio frequency towers can be deployed and combined in groups of three or more. With such a configuration, any standard geometric triangulation algorithm can be used to determine the exact location of the receiving unit. In this way, personal hand held devices, cell phones, intelligent appliances, intelligent apparel, and others can be readily located geographically, if appropriately equipped to be a receiving unit.

For example, at least three cellular towers can each transmit their location information to a receiving cellular phone, or any other receiving device, and if the phones or devices are equipped to perform the triangulation algorithm, then the location of the cellular phone or device can be readily resolved. By further way of example, an amusement park or entertainment facility can deploy three or more transmitting radio frequency devices and provide users with receiving units capable of performing a triangulation algorithm to determine the receiving units location within the amusement park or entertainment facility. In this way, it is readily apparent that a receiving unit need not be exclusively GPS enabled to benefit from the teachings of the present invention.

Figure 2A:
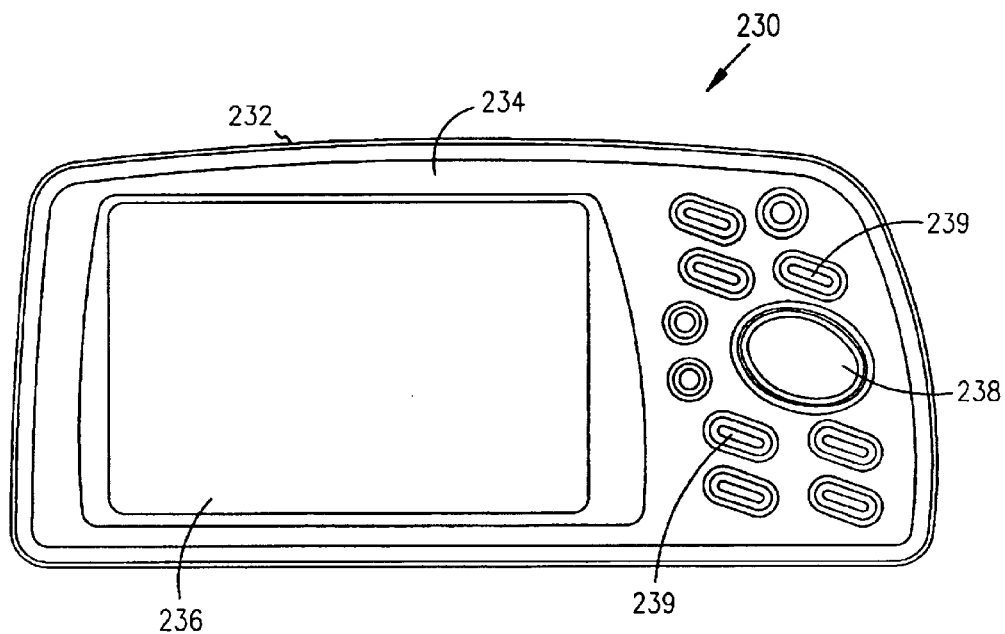
FIGS. 2A and 2B illustrate views for one embodiment of an electronic navigational device according to the teachings of the present invention.
Figure 2B:
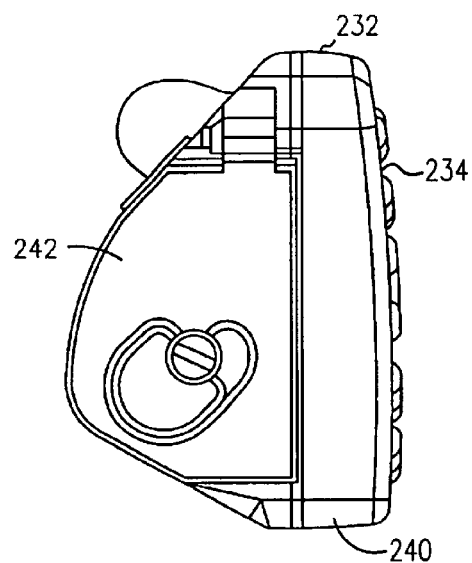

FIGS. 2A and 2B illustrate views for one embodiment of an electronic navigational, device 230 according to the teachings of the present invention. As one of ordinary skill in the art will understand upon reading this disclosure, the device can be portable and can be utilized in any number of implementations such as automobile, personal marine craft, and avionic navigation. In the embodiment of FIG. 2A a front view of the navigational device 230 is provided showing the navigational device has a generally rectangular housing 232. The housing 232 is constructed of resilient material and has been rounded for aesthetic and ergonomic purposes. As shown in FIG. 2A, the control face 234 has access slots for an input key pad 238, other individual keys 239, and a display screen 236. In one embodiment, the display screen 236 is a LCD display which is capable of displaying both text and graphical information. The invention, however, is not so limited. Audio information can likewise be provided in one embodiment.

In FIG. 2B, a side view of the navigational device 230 is provided. FIG. 2B illustrates that the device's housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of one molded piece to form the device housing 232 and support input key pad 238, other individual keys 239, and display screen 236 in respective access slots shown in the control face 234 of FIG. 2A.

FIGS. 3A–3C illustrate views for another embodiment of an electronic navigational device 310 according to the teachings of the present invention. The navigational device 310 shown in FIGS. 3A–3C includes a personal digital assistant (PDA) with integrated GPS receiver and cellular transceiver according to the teachings of the present invention. The GPS integrated PDA operates with an operating system (OS) such as, for example, the well-known Palm or Pocket PC operating systems, or the lesser-used Linux OS. As shown in the top view of FIG. 3A, the GPS integrated PDA 310 includes an internal integrated GPS patch antenna 314 and a cellular transceiver 316 contained in a housing 318. The housing 318 is generally rectangular with a low profile and has a front face 320 extending from a top end 322 to a bottom end 324. Mounted on front face 320 is a display screen 326, which is touch sensitive and responsive to a stylus 330 (shown stored in the side view of FIG. 3B) or a finger touch. FIGS. 3A–3C illustrate the stylus 330 nested within housing 318 for storage and convenient access in a conventional manner. The embodiment shown in FIG. 3A illustrates a number of control buttons, or input keys 328 positioned toward the bottom end 324. The invention, however, is not so limited and one of ordinary skill in the art will appreciate that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and one of ordinary skill in the art will appreciate that a map data cartridge bay slot 332 and headphone jack 334 can be provided at the bottom end 324, separately at opposite ends, or at any other suitable location.

According to embodiments of the invention, the GPS integrated PDA 310 includes a calendar function and an address book function. In some embodiments the GPS integrated PDA 310 includes a to-do list function. In some embodiments the GPS integrated PDA 310 includes a graffiti function. In some embodiments the GPS integrated PDA 310 includes a date book function. In some embodiments the GPS integrated PDA 310 includes a calculator function. In some embodiments the GPS integrated PDA 310 includes a memo pad or note pad function.

It should be understood that the structure of GPS integrated PDA 310 is shown as illustrative of one type of integrated PDA navigation device. Other physical structures, such as a cellular telephone and a vehicle-mounted unit are contemplated within the scope of this invention.

FIGS. 2A–2B and 3A–3C are provided as illustrative examples of hardware components for a navigational device according to the teachings of the present invention. However, the invention is not limited to the configuration shown in FIGS. 2A–2B and 3A–3C. One of ordinary skill in the art will appreciate other suitable designs for a hardware device which can accommodate the present invention.

Figure 4A:
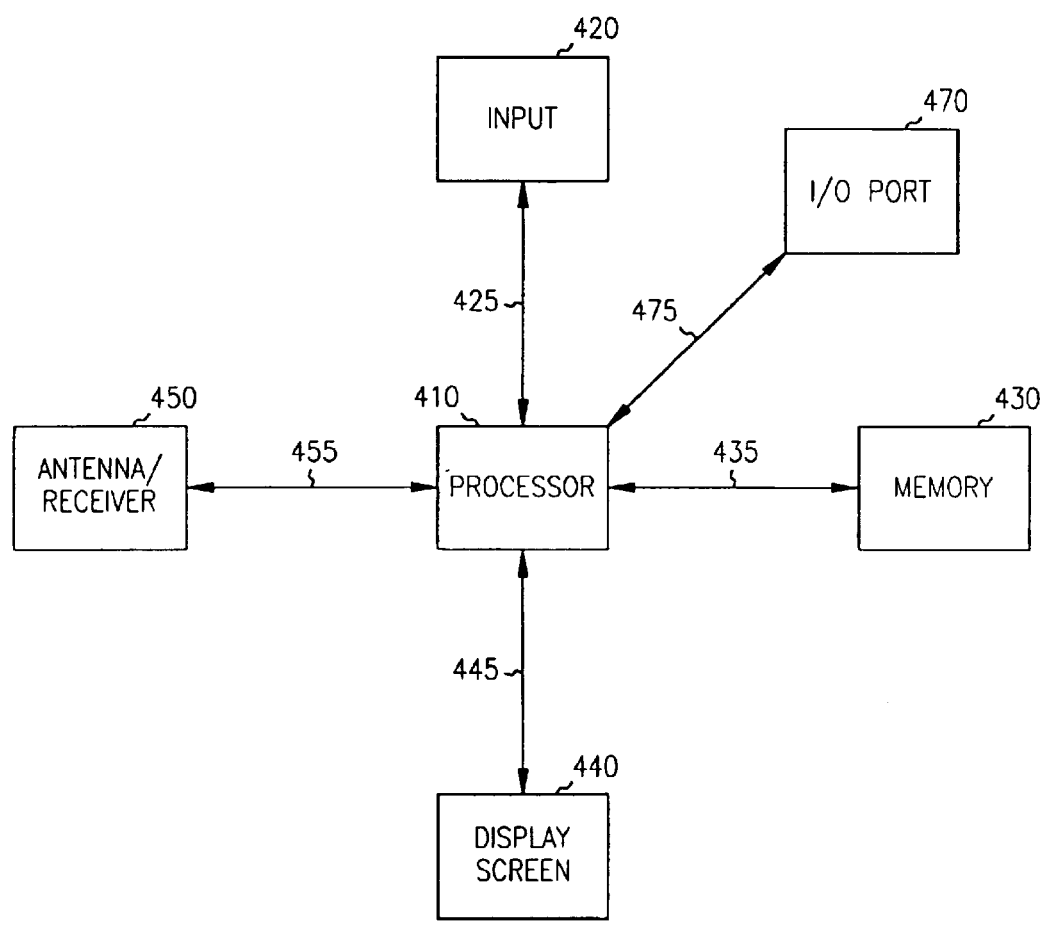
FIG. 4A is a block diagram of one embodiment for the electronic components within the hardware of FIGS. 2A–2B according to the teachings of the present invention.

FIG. 4A is a block diagram of one embodiment for the electronic components within the hardware of FIGS. 2A–2B, such as within housing 232 and utilized by the electronic navigational device. In the embodiment shown in FIG. 4A, the electronic components include a processor 410 which is connected to an input 420, such as keypad via line 425. It will be understood that input 420 may alternatively be a microphone for receiving voice commands. Processor 410 communicates with memory 430 via line 435. Processor 410 also communicates with display screen 440 via line 445. An antenna/receiver 450, such as a GPS antenna/receiver is connected to processor 410 via line 455. It will be understood that the antenna and receiver, designated by reference numeral 450, are combined schematically for illustration, but that the antenna and receiver may be separately located components, and that the antenna may be a GPS patch antenna or a helical antenna. The electronic components further include I/O ports 470 connected to processor 410 via line 475.

Figure 4B:
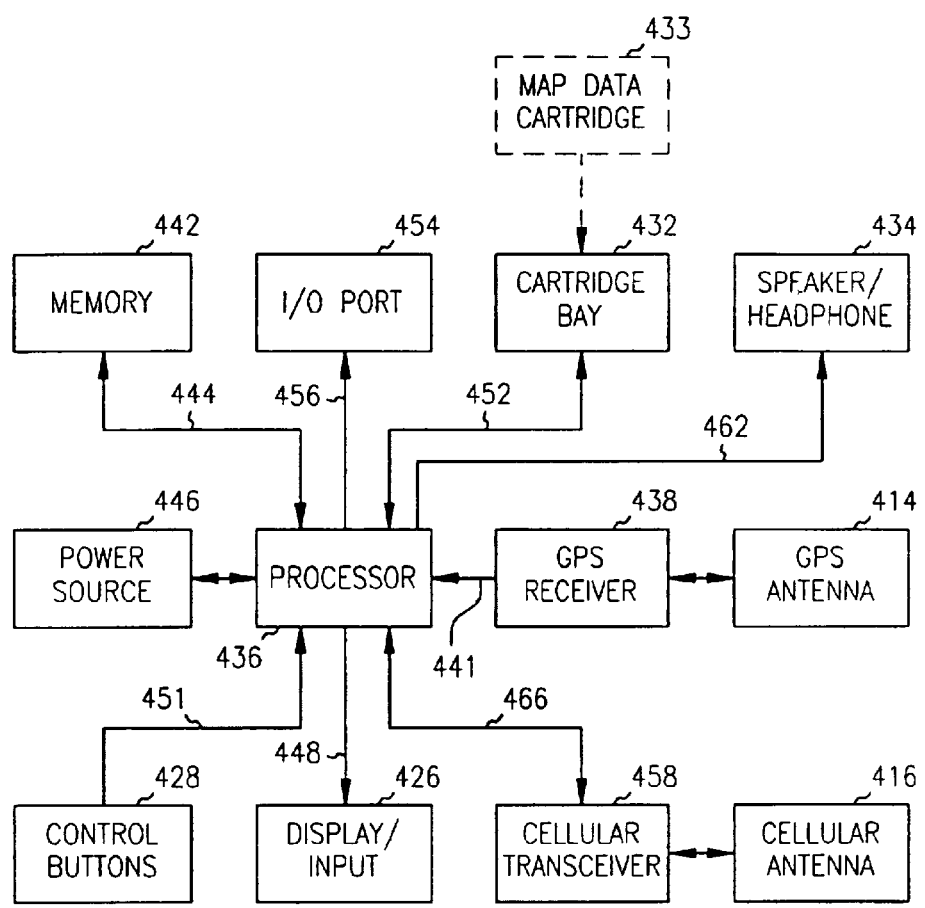
FIG. 4B is a block diagram of one embodiment for the electronic components within the hardware of FIGS. 3A–3C according to the teachings of the present invention.

FIG. 4B is a block diagram of one embodiment for the electronic components within the hardware of FIGS. 3A–3C and utilized by the GPS integrated PDA 310 according to the teachings of the present invention. The electronic components shown in FIG. 4B include a processor 436 which is connected to the GPS antenna 414 through GPS receiver 438 via line 441. The processor 436 interacts with an operating system (such as PalmOS; Pocket PC) that runs selected software depending on the intended use of the PDA 310. Processor 436 is coupled with memory 442 such as RAM via line 444, and power source 446 for powering the electronic components of PDA 310. The processor 436 communicates with touch sensitive display screen 426 via data line 448.

The electronic components further include two other input sources that are connected to the processor 436. Control buttons 428 are connected to processor 436 via line 451 and a map data cartridge 433 inserted into cartridge bay 432 is connected via line 452. A conventional serial I/O port 454 is connected to the processor 436 via line 456. Cellular antenna 416 is connected to cellular transceiver 458, which is connected to the processor 436 via line 466. Processor 436 is connected to the speaker/headphone jack 434 via line 462. The PDA 310 may also include an infrared port (not shown) coupled to the processor 436 that may be used to beam information from one PDA to another.

As will be understood by one of ordinary skill in the art, the electronic components shown in FIGS. 4A and 4B are powered by a power source in a conventional manner. As will be understood by one of ordinary skill in the art, different configurations of the components shown in FIGS. 4A and 4B are considered within the scope of the present invention. For example, in one embodiment, the components shown in FIGS. 4A and 4B are in communication with one another via wireless connections and the like. Thus, the scope of the navigation device of the present invention includes a portable electronic navigational aid device.

Using the processing algorithms of the present invention, the device selects an appropriate starting point for performing a new route calculation and the device recognizes when the device has deviated from the route stored in memory. The device then uses those electronic components to calculate a new route to navigate to the desired destination. According to the teachings of the present invention, the device adjusts a starting point for the new route calculation to a location forward along a current thoroughfare on which the device is located or traveling such that the location is at or forward of the device at a time when the new route calculation is completed. In other words, the device adjusts a starting point for the new route calculation to a location forward along a current thoroughfare on which the device is located or traveling such that the device is on the route at a time when the new route calculation is completed. According to the teachings of the present invention, the device incorporates these and other functions as will be explained in more detail below in connection with FIGS. 6 and 7.

Figure 5:
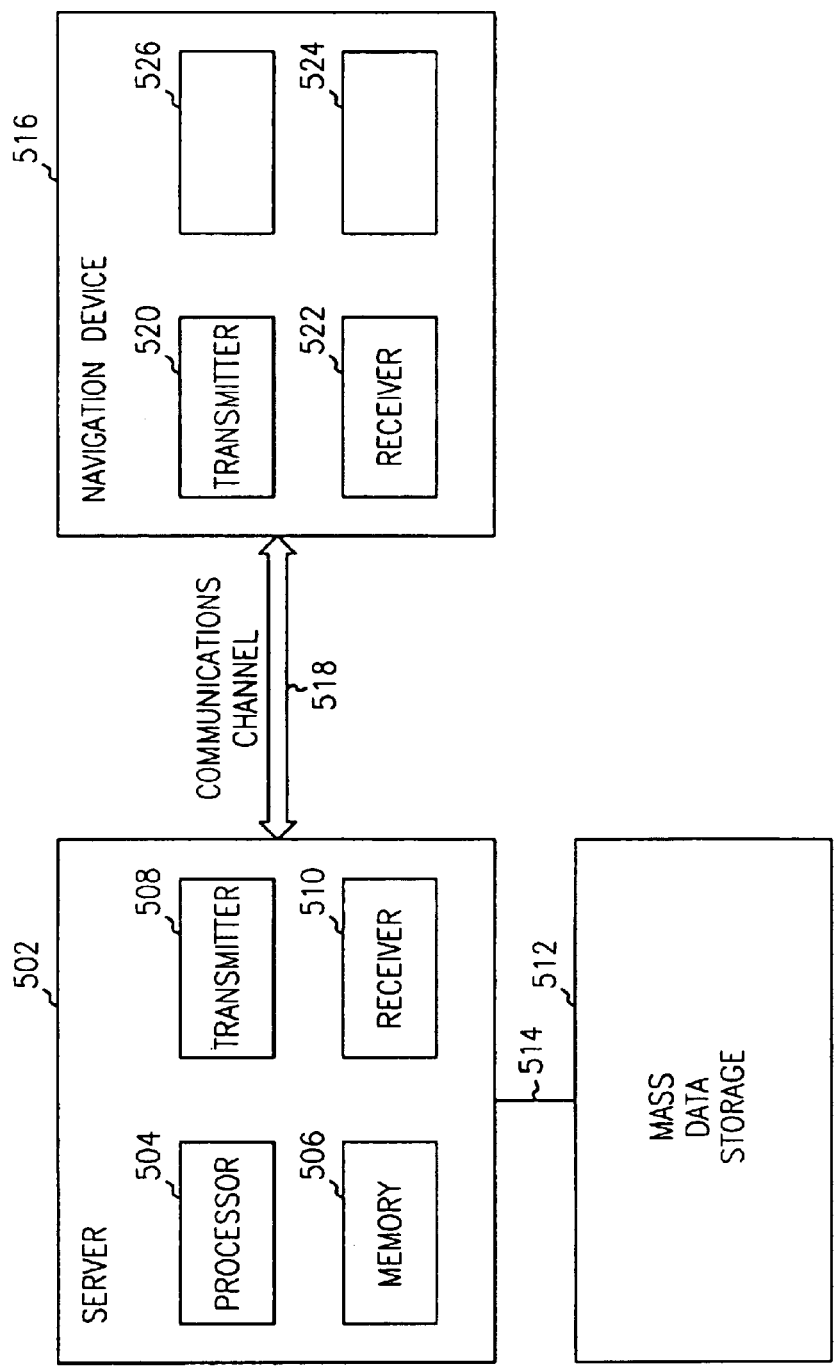
FIG. 5 is a block diagram of a navigation system according to the teachings of the present invention.

FIG. 5 is a block diagram of an embodiment of a navigation system which can be adapted to the teachings of the present invention. The navigation system includes a server 502. According to one embodiment, the server 502 includes a processor 504 operably coupled to memory 506, and further includes a transmitter 508 and a receiver 510 to send and receive data, communication, and/or other propagated signals. The transmitter 508 and receiver 510 are selected or designed according to the communication requirements and the communication technology used in the communication design for the navigation system. The functions of the transmitter 508 and the receiver 510 may be combined into a single transceiver.

The navigation system further includes a mass data storage 512 coupled to the server 502 via communication link 514. The mass data storage 512 contains a store of navigation data. One of ordinary skill in the art will understand, upon reading and comprehending this disclosure, that the mass data storage 512 can be separate device from the server 502 or can be incorporated into the server 502.

In one embodiment of the present invention, the navigation system further includes a navigation device 516 adapted to communicate with the server 502 through the communication channel 518. According to one embodiment, the navigation device 516 includes a processor and memory, as previously shown and described with respect to the block diagram of FIGS. 4A and 4B. Furthermore, the navigation device 516 includes a transmitter 520 and receiver 522 to send and receive communication signals through the communication channel 518. The transmitter 520 and receiver 522 are selected or designed according to the communication requirements and the communication technology used in the communication design for the navigation system. The functions of the transmitter 520 and receiver 522 may be combined into a single transceiver.

Software stored in the server memory 506 provides instructions for the processor 504 and allows the server 502 to provide services to the navigation device 516. One service provided by the server 502 involves processing requests from the navigation device 516 and transmitting navigation data from the mass data storage 512 to the navigation device 516. According to one embodiment, another service provided by the server 502 includes processing the navigation data using various algorithms for a desired application, and sending the results of these calculations to the navigation device 516.

The communication channel 518 is the propagating medium or path that connects the navigation device 516 and the server 502. According to one embodiment, both the server 502 and the navigation device 516 include a transmitter for transmitting data through the communication channel and a receiver for receiving data that has been transmitted through the communication channel.

The communication channel 518 is not limited to a particular communication technology. Additionally, the communication channel 518 is not limited to a single communication technology; that is, the channel 518 may include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 518 includes telephone and computer networks. Furthermore, in various embodiments, the communication channel 516 is capable of accommodating wireless communication such as radio frequency, microwave frequency and infrared communication, and the like. Additionally, according to various embodiments, the communication channel 516 accommodates satellite communication.

The communication signals transmitted through the communication channel 518 include such signals as may be required or desired for a given communication technology. For example, the signals may be adapted to be used in cellular communication technology, such as time division multiple access (TDMA), frequency division multiple access (FDMA), code division multiple access (CDMA), global system for mobile communications (GSM), and the like. Both digital and analog signals may be transmitted through the communication channel 518. According to various embodiments, these signals are modulated, encrypted and/or compressed signals as may be desirable for the communication technology.

The mass data storage includes sufficient memory for the desired navigation application. Examples of mass data storage include magnetic data storage media such as hard drives, optical data storage media such as CD ROMs, charge storing data storage media such as Flash memory, and molecular memory, such as now known or hereinafter developed.

According to one embodiment of the navigation system, the 502 server includes a remote server accessed by the navigation device 516 through a wireless channel. According to other embodiments of the navigation system, the server 502 includes a network server located on a local area network (LAN), wide area network (WAN), a virtual private network (VPN) and server farms.

According to another embodiment of the navigation system, the server 502 includes a personal computer such as a desktop or laptop computer. In one embodiment, the communication channel 518 is a cable connected between the personal computer and the navigation device. According to one embodiment, the communication channel 518 is a wireless connection between the personal computer and the navigation device 516.

FIG. 5 presents yet another embodiment for a collective set of electronic components adapted to the present invention. As one of ordinary skill in the art will understand upon reading and comprehending this disclosure, the navigation system of FIG. 5 is adapted to the present invention in a manner distinguishable from that described and explained in detail in connection with FIGS. 4A and 4B.

That is, the navigational system of FIG. 5 is likewise adapted to provide an electronic navigational aid device 516 with more efficient map matching capabilities. In this embodiment, the processor 504 in the server 502 is used to handle the bulk of the system's processing needs. And as one of ordinary skill in the art will understand the mass storage device 512 connected to the server can include volumes more cartographic and route data than that which is able to be maintained on the navigational device 516 itself. In this embodiment, the server 502 process the majority of a user's travel along the route using a set of processing algorithms and the cartographic and route data stored in memory 512 and can operate on signals, e.g. GPS signals, originally received by the navigational device 516. Similar to the navigational device of FIGS. 4A and 4B, the navigation device 516 in system 500 is outfitted with a display 524 and GPS capabilities 526.

Figure 6:
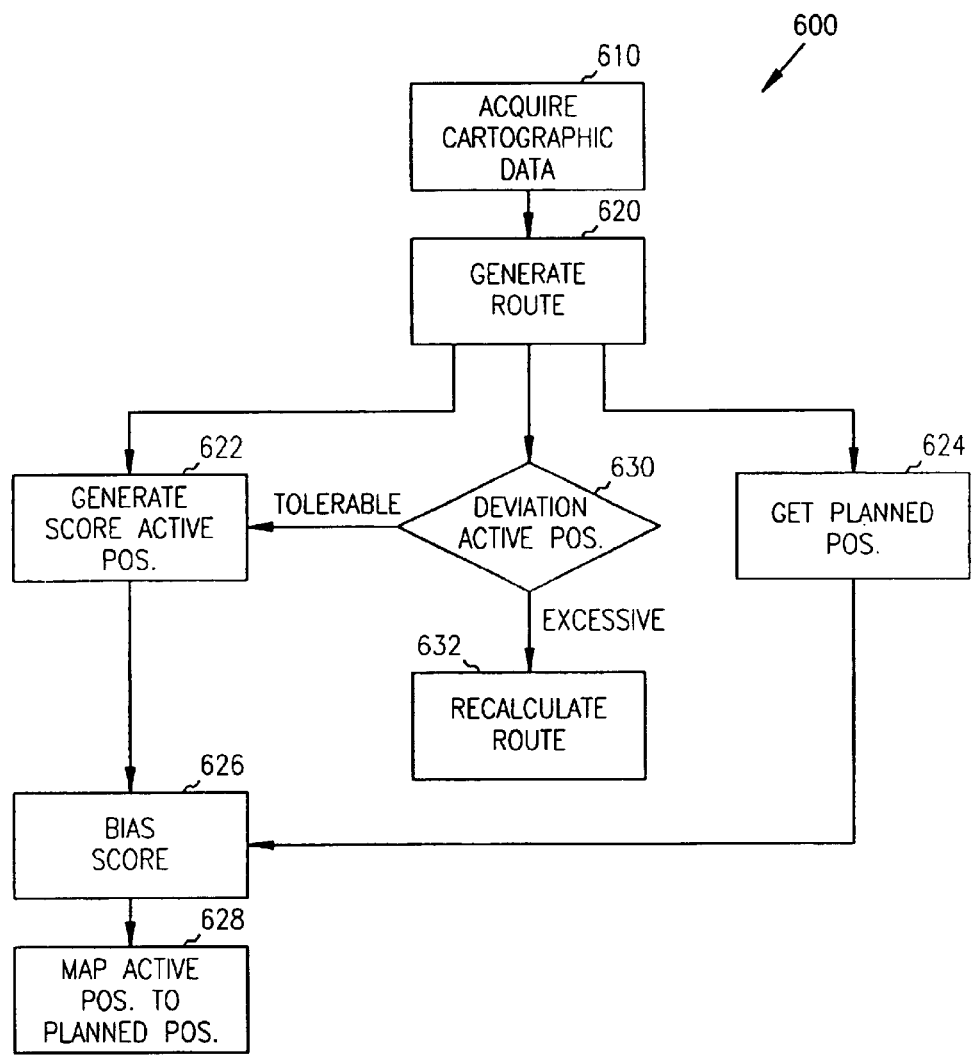
FIG. 6 is a method of one embodiment to bias map matching according to the teachings of the present invention.

FIG. 6 shows one method 600 for one embodiment to bias map matching according to the teachings of the present invention. Initially cartographic data are acquired in step 610. Cartographic data include, by way of example only map data having longitudinal information, latitudinal information, thoroughfare identifications, intersection identifications, thoroughfare classifications (e.g., interstate, residential, country, and the like), and others. From the cartographic data a route is generated or otherwise derived from the map data in step 620. The route includes a path of thoroughfares and/or intersections from an initial location within the map data to a destination location. A variety of techniques are used and well known to those skilled in the art to derive a route from map data given an initial location and a destination location.

Furthermore the initial location, in some embodiments, is represented as an active position within the map data. The active position is dynamically changing as a navigational device uses method 600 and travels. The active position's location is calculated using any navigation system and any triangulation algorithm, well known to those skilled in the art. Additional bearing information associated with the active position is acquired in some embodiments. Bearing information includes, by way of example only, direction of the active position, altitude of the active position, angular orientation of the active position, velocity of the active position, and the like. Of course as one skilled in the art will readily appreciate, not all of these data associated with bearing information need be used or necessary with the present invention. Further bearing information, in some embodiments, is acquired from the navigation system, and may also be included within the map data and associated with each thoroughfare and/or intersection.

Once bearing information for the active position is acquired, scores are generated for all roads within a defined radius, by adding a weighted value associated with each individual piece of bearing information used. For example, an active position's velocity is weighted by multiplying the active position's rate of speed by a fractional multiplier to acquire a weighted value for the active position's velocity. In the same way, the angular orientation of the active position is weighted. The individual weights are then summed to acquire a score for the active position.

As is readily apparent to those skilled in the art, the score need not be a numeric value, as it could be a string value or a mapped value to a specific value contained in a set. Furthermore, values associated with the bearing information in other embodiments are normalized such that the score always falls within a predefined range. The exact scoring mechanism and the exact electronic representation of score can vary and all such variations are intended to fall within the broad scope of the present invention. Moreover, as one skilled in the art will readily note no weighted values need be used since any scoring algorithm will work.

Concurrent, or perhaps serially, to generating the active position score a the planned position located on the route is acquired in step 624. A planned position does not imply that position is not dynamically evaluated. In fact, a planned position is simply a position on a route which is generated for a navigation device. This planned position changes as the active position changes, and is actively compared to numerous additional positions and related scores for each of the additional positions. In this way, scores for all positions on thoroughfares within a defined radius of the active position are scored, the planned position is simply a position on a segment of the generated route. Generation of the score associated with the planned position and all related thoroughfare scores occur in much the same manner as is used when generating the active score. However, weighted bearing information, used in generating the scores is acquired from the map data and not from a navigation system.

Steps 622 and 624 need not occur at all, if in step 630 it is determined that the active position's bearing information excessively deviates from the bearing information associated with a planned position on the route. In this way, if an active position has an angular orientation with respect to its direction of travel of forty degrees, and a thoroughfare on the route has an angular orientation at a planned position, headed in the direction of travel of the active position, of five degrees then a deviation in the active position's bearing information, in some embodiments, is deemed excessive. If the deviation is excessive, then it is determined that the active position is off the route and a new route is recalculated or otherwise acquired in step 632.

If, however, the deviation is tolerable then active score generated in step 622 for the planned position is biased in step 626, so the active position score for the planned position will appear more favorable to the map matching or road locking logic of the navigation device then all other active scores generated in step 622. In this way, the road locking logic of the navigation device is biased in favor of road locking the active position to the planned position within the map data in step 628.

As one skilled in the art will readily appreciate, this biasing permits existing map matching or road locking processes to appear more accurate and desirable to a user, especially when the deviations between an active position's bearing information and planned position's bearing information falls within a tolerable range. Moreover, slight inaccuracies contained within the map data are resolved with the present map biasing techniques.

Figure 7:
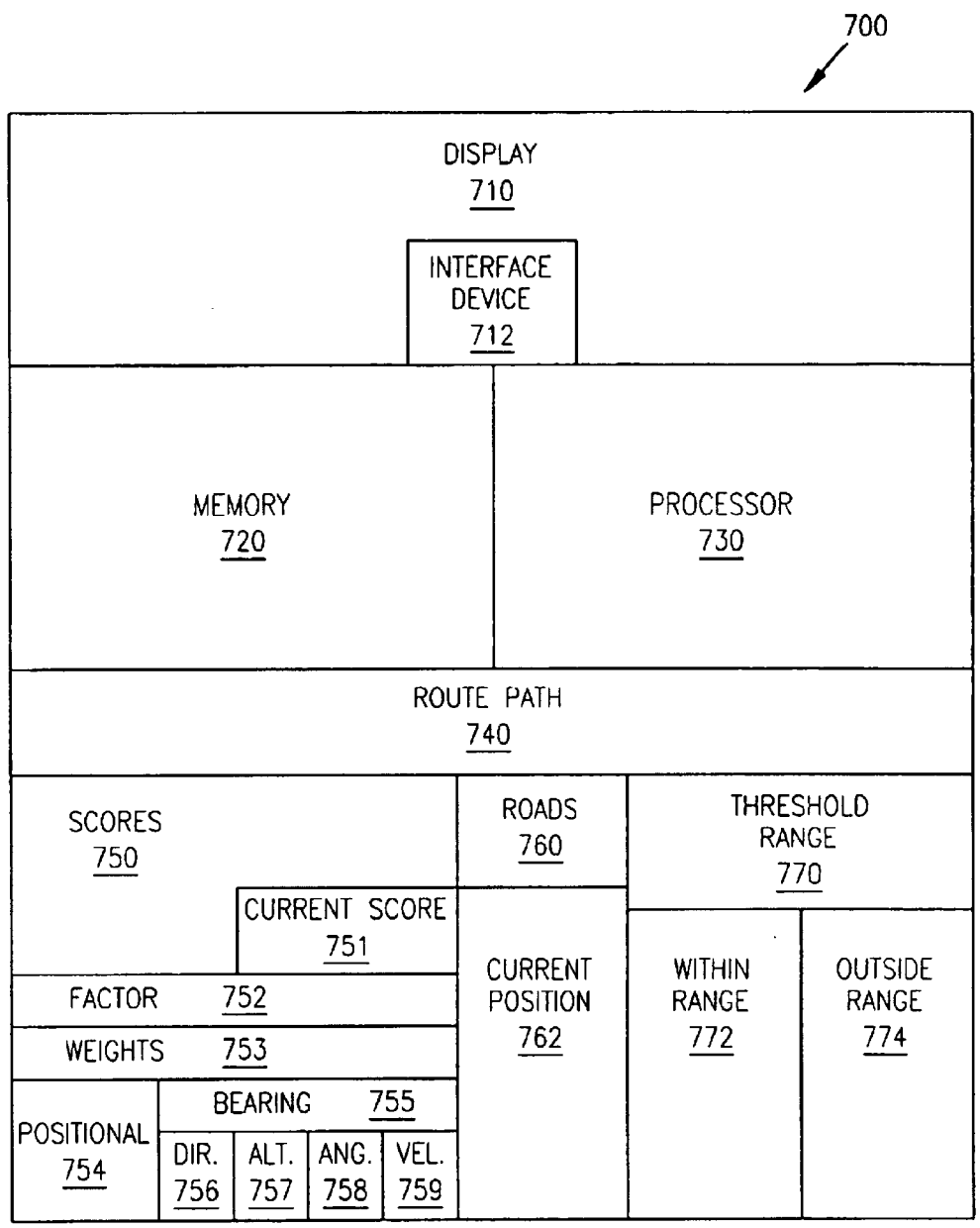
FIG. 7 is a navigational device according to the teachings of the present invention.

FIG. 7 shows a block diagram for one embodiment of a navigation device 700 according to the teachings of the present invention. The navigational device 700 includes a processor 730, a memory 720 in communication with the processor 730, wherein the device 730 uses the memory 720 in cooperation with the processor 730 to dynamically generate one or more scores 750 associated with one or more roads 760 included in a route path 740. Further, a current score 751 is associated with a current position 762 of the device 700 and is biased by a factor 752 in favor of the current position 762 being on the route path 740. Further, at least a portion of the route path 740 is dynamically communicated to the display 710.

In one embodiment, the current score 751 is generated by summing the weighted values 753 associated with positional data 754 and bearing data 755. Positional data 754 includes, by way of example only, longitudinal coordinate data, latitudinal coordinate data, and the like. Bearing data 755 includes, by way of example only, directional data 756, altitudinal data 757, angular orientation data 758, and velocity data 759. Of course, as previously presented any additional or sub combination of positional 754 and bearing data 755 can be used all without departing from the present invention. Moreover, any scoring and/or weighting algorithm can be deployed without departing from the present invention.

Further, in some embodiments the current score 751 when compared to planned scores 750 of roads 760 included on the route path 740 produces a delta. The delta is then compared to a threshold range 770, such that if the delta falls within the range 772 the current position 762 is forced to a planned position and road locked to the route path 740. However, if the delta falls outside the range 774, then the device 700 is detected as being off the route path 740 and an alternative route path correspondingly generated.

For example, a route path 740 consisting of a directed path which includes roads 760 identified as R1→R2→R3 has a current position 762 for device 700 approaching R2. However, at the R1 and R2 transition a fourth road R4 becomes available for device 700. Moreover, if the angular orientation 758 of R2 with respect to R1 is slight when compared to the angular orientation 758 of R4 with respect to R1, then a typical device's map matching or road locking logic could road lock its current position to a position off its route path. However, with the present invention the current score 751 of the present device 700 is biased by a factor 752 (e.g., a factor of 10, or any favorable factor when compared to the threshold range 770) such that when the map matching logic of device 700 compares the current score 751, the current score 751 falls within the range 772 and the current position 762 is road locked to a planned position on the route path 740.

The current position 762 is continuously updated as the device 700 moves, and correspondingly the current score 751 is continuously generated and compared against the threshold range 770. Therefore, in the present example if the device 700 did take the incorrect road R4, at some point the current position 762 combined with the current score would produce a current score 751 outside the range 774 and the device 700 would generate an alternate route path for the device 700 to get the device 700 back on an alternate path to its 700 destination.

As previously discussed a variety of configurations to device 700 can be made without departing from the scope of the present invention. For example, the device 700 can be permanently affixed to a transportation vehicle, detachably affixed to a transportation vehicle; a portable handheld device, an intelligent appliance, a computing device, an intelligent apparel worn by a person or animal, and the like. Moreover, the memory 720 can be remote from the processor 730. And, the device 700 can be equipped to transmit to a separate device the generated route path 740. All of these configurations now known, or hereafter developed are intended to fall within the tenets of the present invention.

Figure 8:
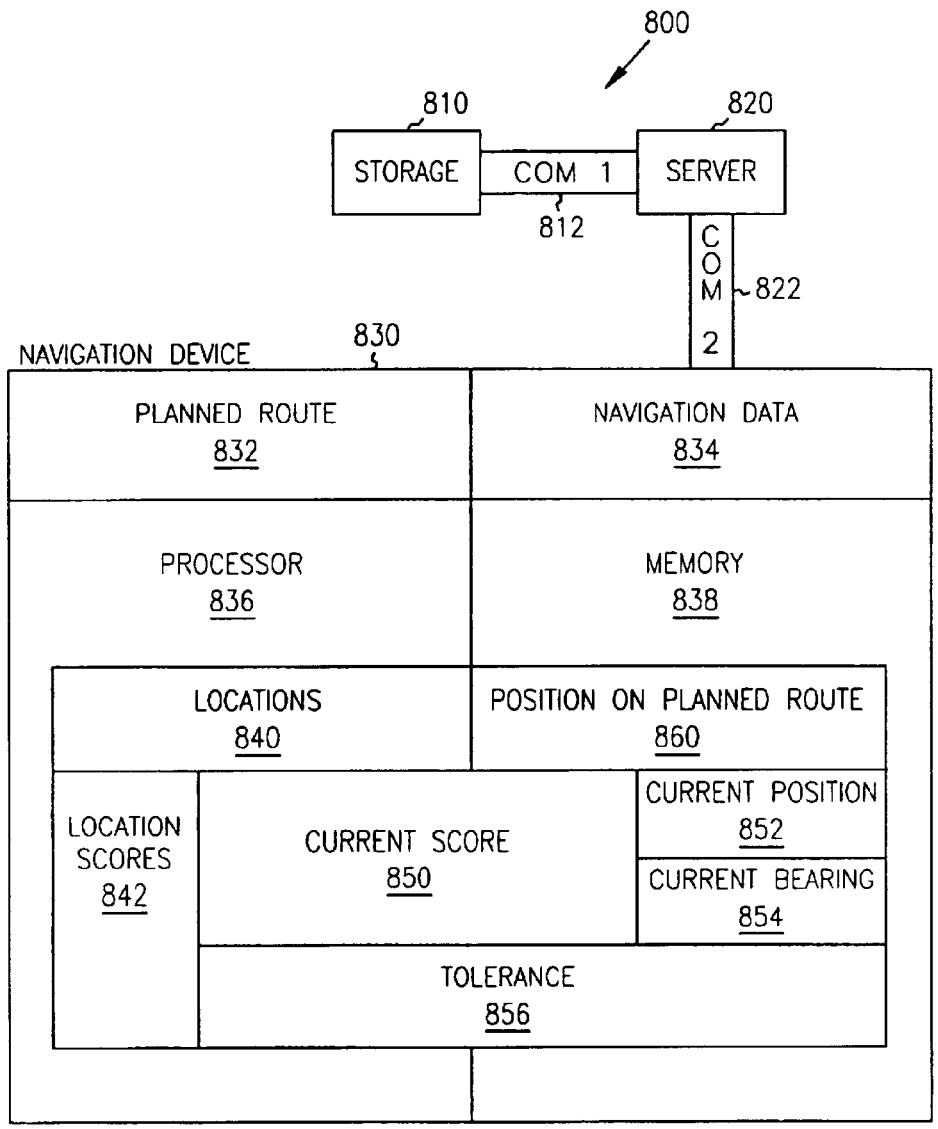
FIG. 8 is a diagram of one embodiment of a navigational system according to the teachings of the present invention.

FIG. 8 shows one diagram for one embodiment of a navigational system 800 according to the teachings of the present invention. The system 800 includes storage 810 adapted to store navigation data 834, a server 820 adapted to communicated with the storage 810 through a communications channel COM1 812, and a navigation device 830 through communications channel COM2 822.

The navigation device 830 further includes a processor 836 in communication with a memory 838 and is adapted to retrieve navigation data 834 from the server 820 though COM2 822. The navigation device's 830 processor 836 and memory 838 cooperate using a set of executable instructions to generate a current score 850 associated with a current position 852 and a current bearing 854 of the device 830. The current score 850 is used to determine whether the device 830 is located on a planned route 832 for the device 830 and is biased to map the current position 852 to a position on the planned route 860 if the current score 850 is within a tolerance level 856.

Further in some embodiments, one or more locations 840, which may be represented as positions on thoroughfares, receive location scores 842. As previously presented, both the current score 850 and the location scores 842 can be generated in a variety of manners using positional data and/or bearing data, and combining the scores with zero or more weighting algorithms. Moreover, the locations scores 842 are regularly compared to the current score 850 to determine if the difference between the scores is within the tolerance level 856. Of course as those skilled in the art will appreciate, the comparison need not be a difference comparison or numeric comparison. A certain degree of differentiation is defined as the tolerance level 856 in some embodiments, such that by tolerating more differentiation the current position 852 is biased to a position on the planned route 860, without altering the current score 850.

The communication channels COM 1812 and COM2 822 need not be hardwired as any single wireless channel or combination of hardwired and wireless channels can be implemented without departing from the present invention. Further, although system 800 depicts map biasing capabilities as being generated entirely within navigation device 830 as one skilled in the art will readily appreciate, this generation can occur in concert with the server 820. Moreover, server 820 can be a server in close proximity to navigation device 830 such that COM2 822 is achieved using infrared or radio frequency communications. Further, COM2 822 could be an Internet or peer-to-peer connection between the server 820 and the navigation device 830. It is readily apparent that a variety of configurations, now known or hereafter developed, are intended to fall within the scope of the present invention.

Figure 9:
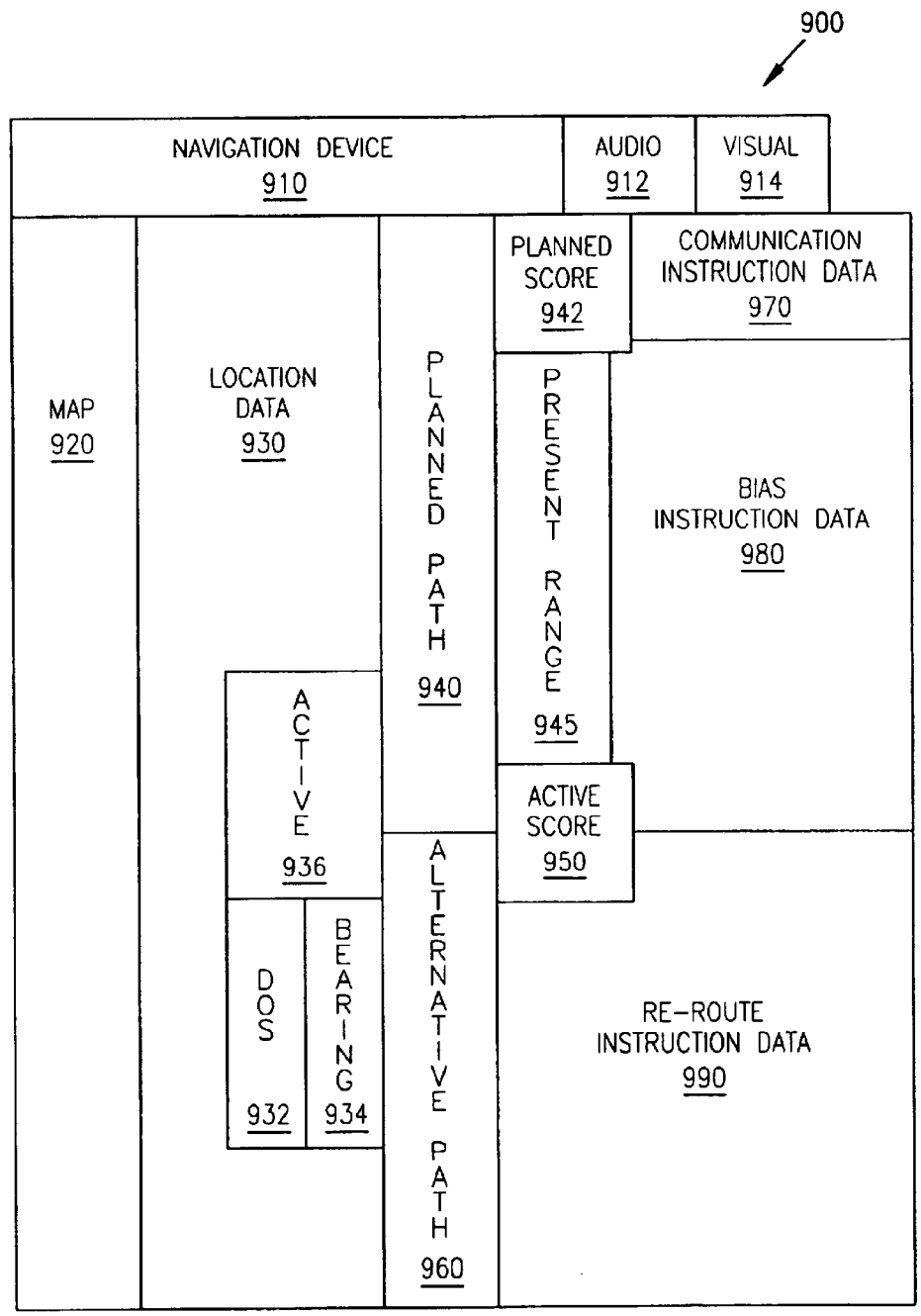
FIG. 9 is a block diagram of one embodiment of functional data according to the teachings of the present invention.

FIG. 9 shows one block diagram for one embodiment of functional data 900 according to the teachings of the present invention. The functional data 900 include active location data 936 operable to be plotted within a map 920 and a planned path 940 comprising planned location data 930 also operable to be plotted within the map 920. Furthermore, the functional data 900 include an active score 950 associated with the active location data 936 and a planned score 942 associated with the planned path 940. Moreover, the functional data 900 include bias instruction data 980 operable to bias the active score 950 in favor of the planned score 942 as long as the active location data 936 do not deviate from the planned path 940 by a preset range 945.

As one skilled in the art will readily appreciate, the functional data 900 of FIG. 9 need not reside contiguously in a single computer readable memory, since the individual pieces of the functional data 900 may be distributed and logically associated to form or later be assembled or otherwise consumed to produce the functional data 900 of FIG. 9. Moreover, the bias instruction data 980, or any instruction data need not reside on a navigation device 910, or any single computing environment, since multiple software programs and computing environments can be used to store or execute the instruction data depicted in FIG. 9 and all permutations and execution sequences are intended to fall within the broad scope of the present invention. Furthermore, not all of the functional data 900 need be processed on the navigational device 910, and navigational device 910 is depicted for purposes of illustration only and is not intended to be included as part of functional data 900.

Additionally, in some embodiments the active location data 936 include active position data 932 and active bearing data 934, such that when the active position data 932 and/or the active bearing data 934 deviate from the planned path 940 by a preset range 945, a re-route instruction data 990 are operable to generate an alternative path 960. Further, in other embodiments the functional data 900 include communication instruction data 970 operable to communicate a biased active location data 936 plotted within the map 920. Moreover, the communication instruction data 970 are operable to communicate with an audio device 912 and/or a visual device 914. Again, audio device 912 and visual device 914 are presented by way of illustration only in FIG. 9 and are not intended to be part of functional data 900.

Further as is readily apparent, the active location data 936 are updated and the bias instruction data 980 dynamically executed repetitively until a termination is detected. A termination is detected when a navigation device 910 using functional data 900 is shut down, produces a non-recoverable error, or the destination of a planned path 940 or an alternative path 960 is reached by the active position data 932 as it is being road locked to the paths.

As one skilled in the art will appreciate, the functional data 900 of FIG. 9 permit a navigation device 910 to use the functional data 900 to bias active location data 936 associated with the active position 932 and active bearing 934 of the device 910 to bias and road lock the active position 932 to a planned position on the planned path 940 or the alternative path 960. In this way, a user of the device 910 is not annoyed by incorrect notifications from the device 910 that the device 910 is off the planned path 940 or alternative path 960, when the device 910 is in fact in the correct location. Moreover, should the location data 930 be slightly inaccurate the present functional data 900 are used to correct the inaccuracies.

Figure 10:
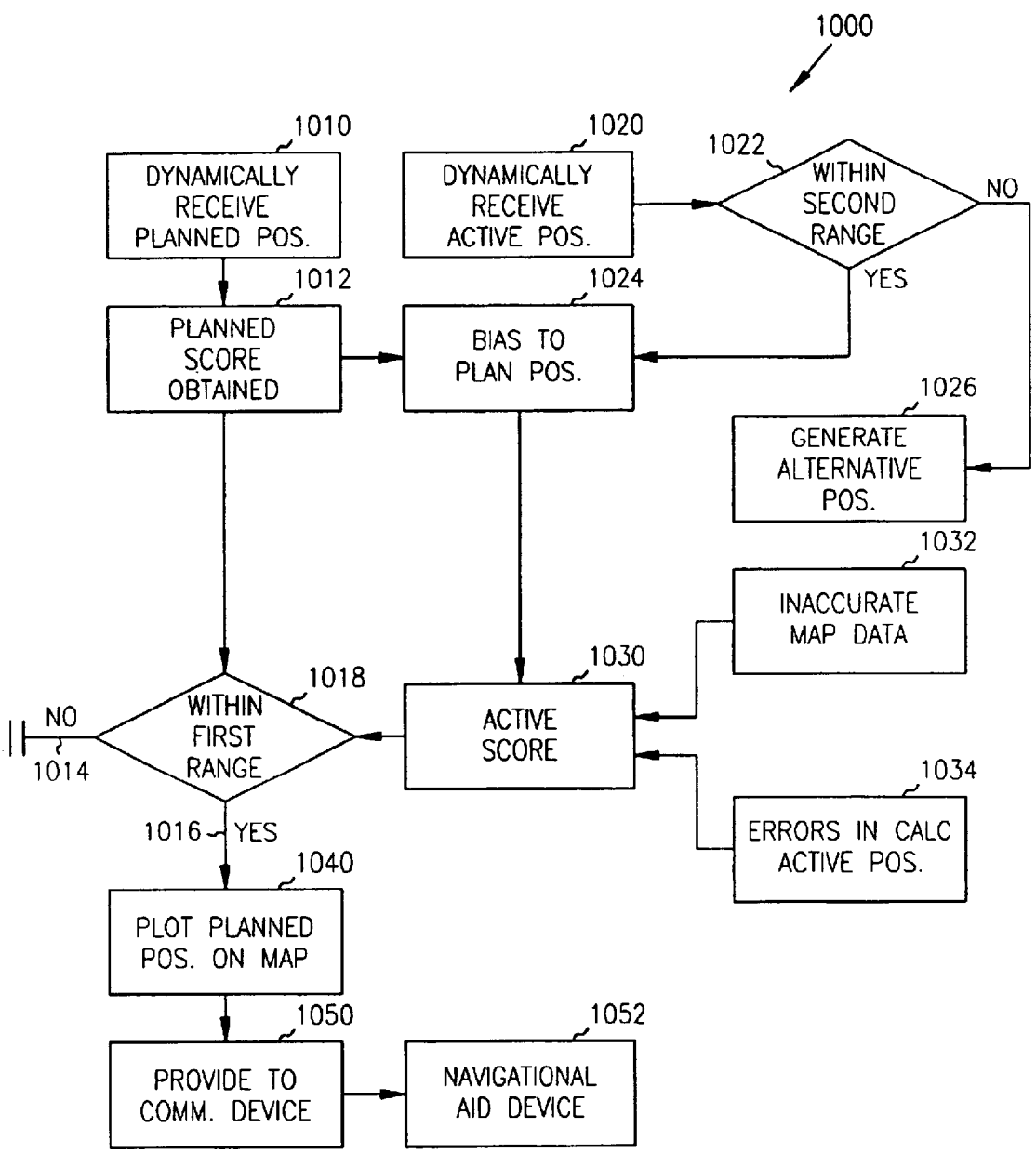
FIG. 10 is a flow diagram of one embodiment of a method to bias map data according to the teachings of the present invention.

FIG. 10 shows one flow diagram for one embodiment of a method 1000 to bias map data according to the teachings of the present invention. Initially, a planned position is received in step 1010 and an active position received in step 1020. The sequence of when each position is received is not relevant, in fact the positions may be received in parallel. Furthermore, as previously presented the planned position and the planned score are dynamically changing as the active position changes, and are related to a generated route segment in close proximity to the active position. Moreover, other thoroughfare positions and corresponding scores are obtained based on a defined radius of the active position. The planned position and score is relevant when biasing the active position.

In some embodiments the planned position is received from a route derived from cartographic data and associated with a navigation device using the method 1000 depicted in FIG. 10. Additionally, the active position is received, calculated, estimated, or otherwise acquired from a separate device using a navigation system to acquire position data and/or bearing data associated with a device using method 1000. The device using method 1000 could also calculate, estimate, or otherwise acquire the active position depicted in FIG. 10.

Once the active and a planned position associated with a route are dynamically received in steps 1010 and 1020, the active position is compared to a preset second range of values associated with its position relative to planned position in step 1022. If the active position when compared to the second range in step 1022 falls outside the second range, then an alternative position residing on an alternatively generated route path is produced in step 1026. And, the biasing depicted in step 1024 is aborted or otherwise not performed.

However, if the active position falls within the second range when compared to the planned position in step 1022, an active score associated with the active position is biased in step 1030. In some embodiments, the biasing is predetermined based on inaccurate map data associated with the planned position in step 1032, or customized to accommodate one or more errors associated with calculating or otherwise estimating the active position in step 1034. Of course as one skilled in the art will appreciate, any biasing technique can be used without departing from the present invention.

Once the active score is biased in step 1030 the active score is forced to be at least as favorable as the planned score obtained, calculated, or otherwise estimated in step 1012. The planned score is associated with a planned position on the route. By forcing the differences between the scores to be favorable and correspondingly fall within a first range in step 1018, it is assured (e.g., line 1016) that the active position will be plotted as if it were the planned position in a map associated with the route in step 1040. If the differences in the scores are not favorable (e.g., line 1014) then an error condition has arisen, and any appropriate executable instructions can be implemented to handle the failure.

Further in other embodiments a plurality of additional planned positions comprise the route within the map. Moreover, in step 1050 the active position (e.g., now the planned position), the route, and the map are dynamically provided to a communication device. Still further, in some embodiments the communication is a navigational device using the method 1000 in step 1052.

As one of ordinary skill in the art will understand upon reading this disclosure, the electronic components of device shown in FIGS. 4A and 4B and components of the system shown in FIG. 5 can be embodied as computer hardware circuitry or as a computer-readable program, or a combination of both. In another embodiment, the system of FIG. 5 is implemented in an application service provider (ASP) system.

More specifically, in the computer-readable program embodiment, the programs can be structured in an object-orientation using an object-oriented language such as Java, Smalltalk, C++, and others, and the programs can be structured in a procedural-orientation using a procedural language such as C, PASCAL, and others. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI).

Of course it is readily appreciated by those skilled in the art that any programming methodology, programming language, programming interface, operating system, or computing environment, now known or hereafter developed can be readily deployed, without departing from the tenets of the present invention and all such implementation specific embodiments are intended to fall within the broad scope of the present invention.

CONCLUSION

The above systems, devices and methods have been described, by way of example and not by way of limitation, with respect biasing map matching capabilities, providing more accurate map matching. That is, the systems, devices, functional data, and methods provide for biasing a current position to a planned position on a route contained within a map, when the current position does not excessively deviate from the route. The systems, devices, functional data, and methods of the present invention offer improved map biasing techniques to a user utilizing a navigation device.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices, functional data, and methods are used. The scope of the invention should be determined with reference to the appended claims, along with the full scope of equivalents to which such claims are entitled.

What is claimed is:

1. A personal digital assistant (PDA), comprising:

a calendar function;

an address book function;

a processor operably in communication with a memory and a display;

wherein the PDA uses the memory in cooperation with the processor to dynamically generate one or more scores associated with one or more roads included in a route path for the device, wherein a current score associated with a current position of the device is biased by a factor in favor of the current position being on the route path; and wherein at least a portion of the route path is dynamically communicated to the display.

2. The PDA of claim 1, further comprising an interface device operable to audibly communicate the route path.

3. The PDA of claim 1, wherein each of the scores comprise a positional weight and a bearing weight.

4. The PDA of claim 3, wherein the memory in communication with the processor of the PDA detects a location off of the route path if a delta associated with at least one of a current position and a current bearing of the PDA falls outside a predefined threshold range associated with the route path.

5. The PDA of claim 4, wherein the current bearing includes at least one of an angle associated with the PDA, a velocity associated with the PDA, a direction of travel associated with the PDA, and an altitude associated with the PDA.

6. The PDA of claim 1, wherein the current score continuously updates as the PDA moves.

7. The PDA of claim 1, wherein the PDA includes a telecommunication function operable for transmitting and receiving voice data.

8. The device of claim 1, wherein the PDA includes a Bluetooth capability.

9. A PDA system, comprising:

a storage device operable to store navigation data;

a server operable to communicate with the storage device; and a PDA device operable to communicate with and retrieve navigation data from the server via a communication channel, wherein the PDA includes a processor in communication with a memory, wherein the processor and memory cooperate to generate a current score associated with a current position and a current bearing of the PDA, the current score is used to determine whether the PDA is located on a planed route for the PDA and is biased to map the current position to a position on the planned route for the PDA and whether the current score is within a tolerance level.

10. The system of claim 9, wherein the communication channel includes a wireless channel.

11. The system of claim 9, wherein one or more locations receive one or more location scores based on the planned route.

12. The system of claim 11, wherein the current score is regularly compared to the location scores to determine if the current score is within the tolerance level.

13. PDA functional data to bias a location to a map, comprising:

in a PDA, active location data operable to be plotted within the map;

a planned path including planned location data operable to be plotted within the map;

an active score associated with the active location data and a planned score associated with the planned path; and bias instruction data to bias the active score in favor of the planned score as long as the active location data do not deviate from the planned path by a preset range.

14. The PDA functional data of claim 13, wherein the active location data include an active position and an active bearing.

15. The PDA functional data of claim 14, further comprising re-route instruction data operable to generate an alternative path to the planned path when the active location data deviates from the planned path by the preset range.

16. The PDA functional data of claim 13, wherein at least a portion of the functional data is processed on a navigational device.

17. The PDA functional data of claim 13, further comprising communication instruction data operable to communicate a biased active location data plotted within the map.

18. The PDA functional data of claim 17, wherein the communication instruction data is further operable to communicate at least one of an audio device and a visual device.

19. The PDA functional data of claim 13, wherein the active location data are updated and the bias instruction data executed dynamically and repetitively until a termination is detected.

20. A method to bias an active position to a planned position for a PDA, comprising:

in a PDA, dynamically receiving the active position and the planned position;

biasing an active score associated with the active position by forcing the active score to be at least as favorable as a planned score associated with the planned position ensuring that the difference between the active score and the planned score fall within a first range; and aborting the biasing if the active position falls outside a second range.

21. The method of claim 20, further comprising dynamically generating an alternative position if the biasing was aborted.

22. The method of claim 20, wherein the biasing is predetermined based on inaccurate map data associated with the planned position.

23. The method of claim 22, wherein the biasing is based on one or more errors associated with calculating the active position.

24. The method of claim 20, further comprising plotting the active position as if it were the planned position in a map if the biasing was not aborted.

25. The method of claim 24, wherein a plurality of additional planned positions comprise a route within the map.

26. The method of claim 25, wherein the active position, the route and the map are dynamically provided to a communication device.

27. The method of claim 26, wherein the method is used in PDA having cell phone capabilities.

28. A personal digital assistant (PDA), comprising:

a calendar function;

an address book function;

a processor operably in communication with a memory and a display;

means for dynamically generating one or more scores associated with one or more roads included in a route device, wherein a current score associated with a current position of the device is biased by a factor in favor of the current position being on the route path; and means for dynamically communicating at least a portion of the route path to the display.

* * * * *